(12) United States Patent
Doyle et al.

(10) Patent No.: US 7,954,508 B2
(45) Date of Patent: Jun. 7, 2011

(54) ELECTRONICALLY CONTROLLED VALVE ACTUATOR IN A PLUMBED WATER LINE WITHIN A WATER CONDITIONING MANAGEMENT SYSTEM

(75) Inventors: Kevin Doyle, Delray Beach, FL (US); Keith Schulte, Coconut Crk, FL (US); Bruce Johnson, Parkland, FL (US)

(73) Assignee: KBK Technologies, Inc., Deerfield Beach, FL (US)

( * ) Notice: Subject to any disclaimer, the term of this patent is extended or adjusted under 35 U.S.C. 154(b) by 145 days.

(21) Appl. No.: 11/515,949

(22) Filed: Sep. 6, 2006

(65) Prior Publication Data

US 2007/0205232 A1  Sep. 6, 2007

Related U.S. Application Data

(60) Provisional application No. 60/778,392, filed on Mar. 3, 2006.

(51) Int. Cl.
*F16K 11/02* (2006.01)

(52) U.S. Cl. ............... 137/487.5; 137/554; 137/872

(58) Field of Classification Search ............... 137/487.5, 137/553, 554, 872–876
See application file for complete search history.

(56) References Cited

U.S. PATENT DOCUMENTS

| | | |
|---|---|---|
| 3,867,290 A | 2/1975 | Mackey |
| 4,085,028 A | 4/1978 | McCallum |
| 4,100,052 A | 7/1978 | Stillman |
| 4,136,005 A | 1/1979 | Persson et al. |
| 4,244,802 A | 1/1981 | Pohto et al. |
| 4,255,246 A | 3/1981 | Davis et al. |
| 4,336,225 A | 6/1982 | Hanford, Jr. et al. |
| 4,439,295 A | 3/1984 | Richards |
| 4,472,256 A | 9/1984 | Hilbig |
| 4,500,404 A | 2/1985 | Tucker |
| 4,508,687 A | 4/1985 | Houghton |
| 4,599,159 A | 7/1986 | Hilbig |
| 4,714,534 A | 12/1987 | Fair et al. |
| 4,767,511 A | 8/1988 | Aragon |
| 4,808,290 A | 2/1989 | Hilbig |
| 4,861,451 A | 8/1989 | David |
| 4,923,618 A | 5/1990 | Casberg et al. |
| 5,027,853 A * | 7/1991 | Walko et al. ............. 137/554 |
| 5,037,519 A | 8/1991 | Wiscombe |
| 5,053,114 A | 10/1991 | Maddock |
| 5,124,032 A | 6/1992 | Newhard |
| 5,221,444 A | 6/1993 | Silveri |
| 5,223,822 A * | 6/1993 | Stommes et al. ........... 137/551 |

(Continued)

FOREIGN PATENT DOCUMENTS

EP         0590762        4/1992

*Primary Examiner* — Stephen M Hepperle
*Assistant Examiner* — William McCalister
(74) *Attorney, Agent, or Firm* — Eric J. Weierstall, esq.; Tangent Law Group, PLLC

(57) ABSTRACT

An electronically controlled actuator in a plumbed water line within a water conditioning management system, having an at least one valve with a valve stem in a plumbed water line within the water conditioning management system, an at least one actuator, an at least one actuator housing, an at least one electronic controller in communication with the actuator, an at least one shaft coupled to the actuator and said valve; an at least one shaft encoding device; and an at least one user interface with multiple indicator elements indicating the position of valve.

7 Claims, 4 Drawing Sheets

U.S. PATENT DOCUMENTS

| | | | |
|---|---|---|---|
| 5,362,368 A | 11/1994 | Lynn et al. | |
| 5,427,140 A * | 6/1995 | Bosanquet | 137/554 |
| 5,427,658 A | 6/1995 | Allen | |
| 5,468,360 A | 11/1995 | David et al. | |
| 5,541,363 A | 7/1996 | Weise et al. | |
| 5,567,283 A | 10/1996 | Lynn et al. | |
| 5,647,396 A * | 7/1997 | Stommes et al. | 137/554 |
| 5,656,771 A * | 8/1997 | Beswick et al. | 73/114.68 |
| 5,732,619 A * | 3/1998 | Hata et al. | 100/341 |
| 5,807,473 A | 9/1998 | Sadler et al. | |
| 5,993,669 A | 11/1999 | Fulmer | |
| 5,993,753 A | 11/1999 | Davidson | |
| 6,096,202 A | 8/2000 | Fulmer | |
| 6,238,555 B1 | 5/2001 | Silveri et al. | |
| 6,277,288 B1 | 5/2001 | Gargas | |
| 6,391,167 B1 | 5/2002 | Grannersberger | |
| 6,517,713 B2 | 2/2003 | Gargas | |
| 6,551,518 B2 | 4/2003 | Gargas | |
| 6,656,353 B2 | 12/2003 | Kilawee et al. | |
| 6,820,647 B1 * | 11/2004 | Grecco et al. | 137/552 |
| 6,938,586 B2 * | 9/2005 | Manners et al. | 123/41.1 |
| 2003/0024809 A1 | 2/2003 | Broembsen | |
| 2005/0016592 A1 * | 1/2005 | Jeromson et al. | 137/487.5 |
| 2006/0054219 A1 * | 3/2006 | Sund et al. | 137/487.5 |
| 2006/0243328 A1 * | 11/2006 | Bessmertny | 137/487.5 |

* cited by examiner

SECTION A-A

ELECTRONICALLY CONTROLLED VALVE ACTUATOR IN A PLUMBED WATER LINE WITHIN A WATER CONDITIONING MANAGEMENT SYSTEM

CROSS-REFERENCE TO RELATED APPLICATIONS

This application claims the priority of U.S. provisional patent application 60/778,392, filed Mar. 3, 2006, which is incorporated herein by reference.

BACKGROUND OF THE INVENTION

1. Field of the Invention

The invention relates to the operation of electrically powered valve actuators, particularly the application of electrically powered valve actuators as a component of a plumbed system for water treatment.

2. Background of the Invention

In many industries, there exists a need to control electrically powered valve actuators. Existing electrically powered valve actuators cannot accommodate the myriad of possibilities that may be encountered in a complex plumbing system utilized in, for instance, the treatment of water. A need exists for an easily programmable actuator with both flexible programming and control and the ability to respond expeditiously to a variety of inputs, change state, and maintain safety limits.

There exists a need to provide an electrically powered valve actuator that includes electronics that allow the user the ability to control and program the valve actuator via electronics accessible to the user. Moreover, convenient and intuitive programming capabilities must be available to the user. In addition, for both convenience and safety, the ability to manually override the programming must be made available to the user. Further, the system needs to provide the ability to operate the valve in a number of pre-determined movements or operating positions. Finally, the actuator may also be equipped with reversing motors and have two cams, one for clockwise and the other counterclockwise motions.

SUMMARY OF THE INVENTION

An object of the invention is to provide an electrically powered valve actuator that includes electronics that allow the user the ability to control and program the valve actuator via electronics accessible to the user.

A further object of the invention is to provide convenient and intuitive programming capabilities to the user of an electrically powered valve actuator to program set points for the operation of the electrically powered valve actuator.

Yet another object of the invention is to provide the ability to manually override the programming of the electrically controlled valve actuator.

The method of the invention includes a method for electronically controlling and operating a valve actuator in a plumbed water condition management system, the actuator being in line with the plumed water condition management system, comprising the method steps of sensing a variable of the water treatment system with a sensor; communicating this variable to a controller; controlling and moving the position of a valve via an actuator based on the input of the sensing step; and displaying the valve position through an at least one user interface.

The method can further comprise the method steps of programming the controller to adjust to an at least one data input and moving the actuator based on the data input. Additionally, the controlling step can be performed by a master controller of the water condition management system. The method master controller can be part of the valve actuator. The step of programming the controller can include the step of adjusting the controller based on at least one data input from at least one of a pressure switch, flow switch, valve condition sensors, water condition sensors, temperature sensors, ph sensors, salinity sensors, chemical sensors, pressure sensors, overall chemical makeup sensors, and flow speed sensors input.

The method can further comprise the method steps of overriding the controlling step and the controller via manual input from the at least one user interface and manually controlling the controller through the user interface. The method can also comprise the additional method step of programming an at least one custom set point by engaging the controller through an at least one user interface to put the system in a set mode and inputting the at least one custom set point through the at least one user interface while in the set mode.

The method can additionally comprise the step of providing user input through the at least one user interface to control the position of the actuator manually when not operating in an automatic mode and the further step of displaying the direction and position of the valve on the at least one user interface.

The step of displaying the valve position can further comprise displaying the position of the valve through a circle of indicator elements, the indicator elements changing a display condition to indicate the position of the valve. The indicator elements can be LED's and the method of displaying the position of the valve can further comprise turning the LED's on or off or blinking to indicate the position of the valve.

The controlling step can additionally comprise the method step of programming a first of an at least two set points and a second of an at least two set points. The controlling step can further comprise controlling the position of the valve between the first of an least two set points and the second of an at least two set points. The step of displaying the valve position can further comprise indicating a direction of traverse for the valve and indicating when the controller is communicating with external controllers or sensors and indicating the operating mode of the actuator in at least one of an automatic, manual, set point, and programming mode. The method can additionally comprise the step of indicating a warning if the movement of the valve actuator in its traverse is through a safe zone.

The apparatus of the invention includes an electronically controlled actuator in a plumbed water line within a water conditioning management system with an at least one valve with a valve stem in a plumbed water line within the water conditioning management system with an at least one actuator, an at least one actuator housing, an at least one electronic controller in communication with the actuator, an at least one shaft coupled to the actuator and said valve, an at least one shaft encoding device and an at least one user interface with multiple indicator elements indicating the position of valve.

The at least one user interface can further comprise an at least one indicator element. The at least one indicator element can be an LED. The LED can be a plurality of LEDs arranged in a circle and triggered to light upon the passing of the valve through a designated position. The at least one user interface can further comprise an at least one manual input for adjusting the at least one valve. The at least one manual input can further comprise two manual inputs one associated with manual clockwise and the other associated with manual counterclockwise operation of the valve.

The at least one user interface can further comprise an at least one set point indicator. The housing can further comprise a first housing component, a second housing component and a chassis, the first housing component being coupled to the second housing component and the chassis being held therebetween, the housing further containing the controller and the actuator and being releasably sealed and watertight. The can further comprise a warning indicator as part of the at least one user interface, the warning indicator indicating the passage of the valve into a restricted zone. The electronically controlled actuator can additionally comprise an at least one user interface, where the at least one user interface includes and override input which must be pressed to move the actuator into the restricted zone.

The apparatus of the invention also includes an electronically controlled salt dispensing system valve actuator within a salt dispensing system in communication with a brine tank, with a housing, an at least one control input, an at least one shaft, an at least one motor coupled to and turning the shaft; an at least one shaft encoding device reading the position of the at least one shaft, a controller, where said controller activates the motor to turn the electronically controlled salt dispensing valve actuator based on an input from the at least one control input to direct water within the salt dispensing system.

The control input can be from an at least one pressure switch, flow switch, valve condition sensor, water condition sensor, temperature sensor, ph sensors, salinity sensor, chemical sensor, pressure sensor, overall chemical makeup sensor, and flow speed sensor. The actuator can switch the valve position to divert water to the brine tank within the salt dispensing system based on data input from the controller. The actuator can switch the valve position to withdraw brine from the brine tank within the salt dispensing system as well.

The electronically controlled salt dispensing system valve actuator can further comprise an at least one user interface having an at least one indicator element indicating the position of the valve. The at least one indicator element can be an at least one LED arranged in a circular pattern. The at least one indicator element can further comprise an indicator element indicating a direction of traverse for the valve, an indicator element indicating when the controller is communicating with external controllers or sensors, and an indicating element indicating the operating mode of the actuator in at least one of an automatic, manual, set point, and programming mode.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations that will be apparent to those skilled in the art.

BRIEF DESCRIPTION OF THE DRAWINGS

Embodiments of the invention are explained in greater detail by way of the drawings, where the same reference numerals refer to the same features.

DETAILED DESCRIPTION OF THE INVENTION

Definitions

Figure 1A:
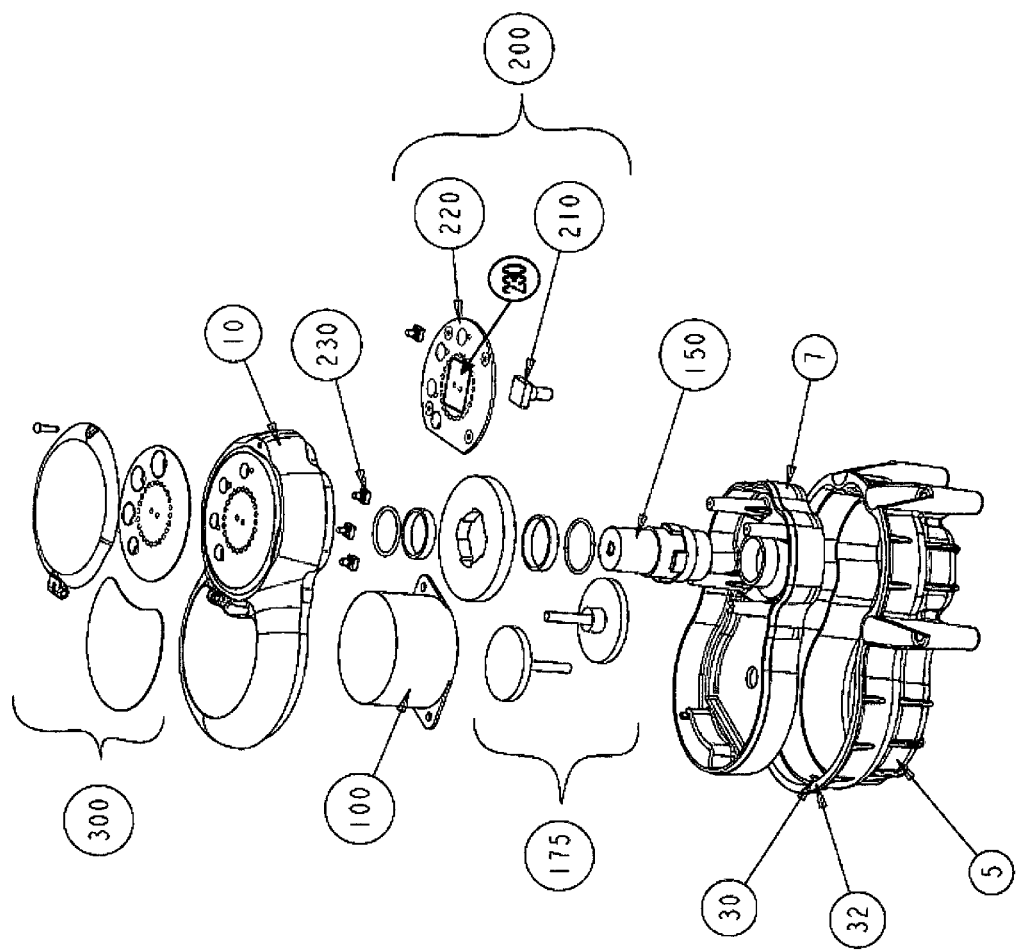
FIGS. 1A and 1B show an exploded view and an overview, respectively of an exemplary embodiment of the instant invention.

In describing the invention, the following definitions are applicable throughout.

A "computer" or "controller" refers to any apparatus that is capable of accepting a structured input, processing the structured input according to prescribed rules, and producing results of the processing as output. Examples of a computer or controller include: a microprocessor, a programmable logic chip, a digital signal processor, a microcontroller, a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM and a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

A "network" refers to a number of controllers, computers, programmable logic devices, and/or network controllers and associated devices by a communication system and/or communication facilities to allow for communication. A network may involve permanent connections such as cables or other terrestrial components or temporary connections such as those made through telephone, satellite, cellular systems, radio frequency transceivers, or other wireless communication links. Examples of networks include: a cellular communications network, radio frequency networks, wireless data networks, an internet—such as the Internet; an intranet, a local area network (LAN); a wide area network (WAN); a controller area network (CAN), local interconnect network (LIN) and a combination of networks, such as an internet and an intranet.

A "communications protocol" refers to a pre-defined standard for transmitting data to or between electrical devices, such as controllers or computers, typically within an electronic device or within a network. A non-limiting example of a communications protocol or standard includes the RS-485 protocol.

An "information storage device" refers to an article of manufacture used to store information. An information storage device has different forms, for example, paper form and electronic form. In paper form, the information storage device includes paper printed with the information. In electronic form, the information storage device includes a computer-readable medium storing the information as software, for example, as data.

A "user interface device" refers to a device utilized by a user. A user interface device refers to any apparatus that is capable of providing a user the ability to interact with and program a computer, non-limiting examples include a mouse, a keyboard, a PDA, a handheld computer, or similar device.

The embodiments and examples discussed herein are non-limiting examples.

Detailed Description of the Non-Limiting Exemplary Embodiments of the Figures

Reference is made herein to exemplary embodiments shown in the figures, however, these references non-limiting examples of exemplary embodiments and should not be construed to limit this disclosure. With respect to the figures, similar reference numerals indicate similar components.

Figure 1B:
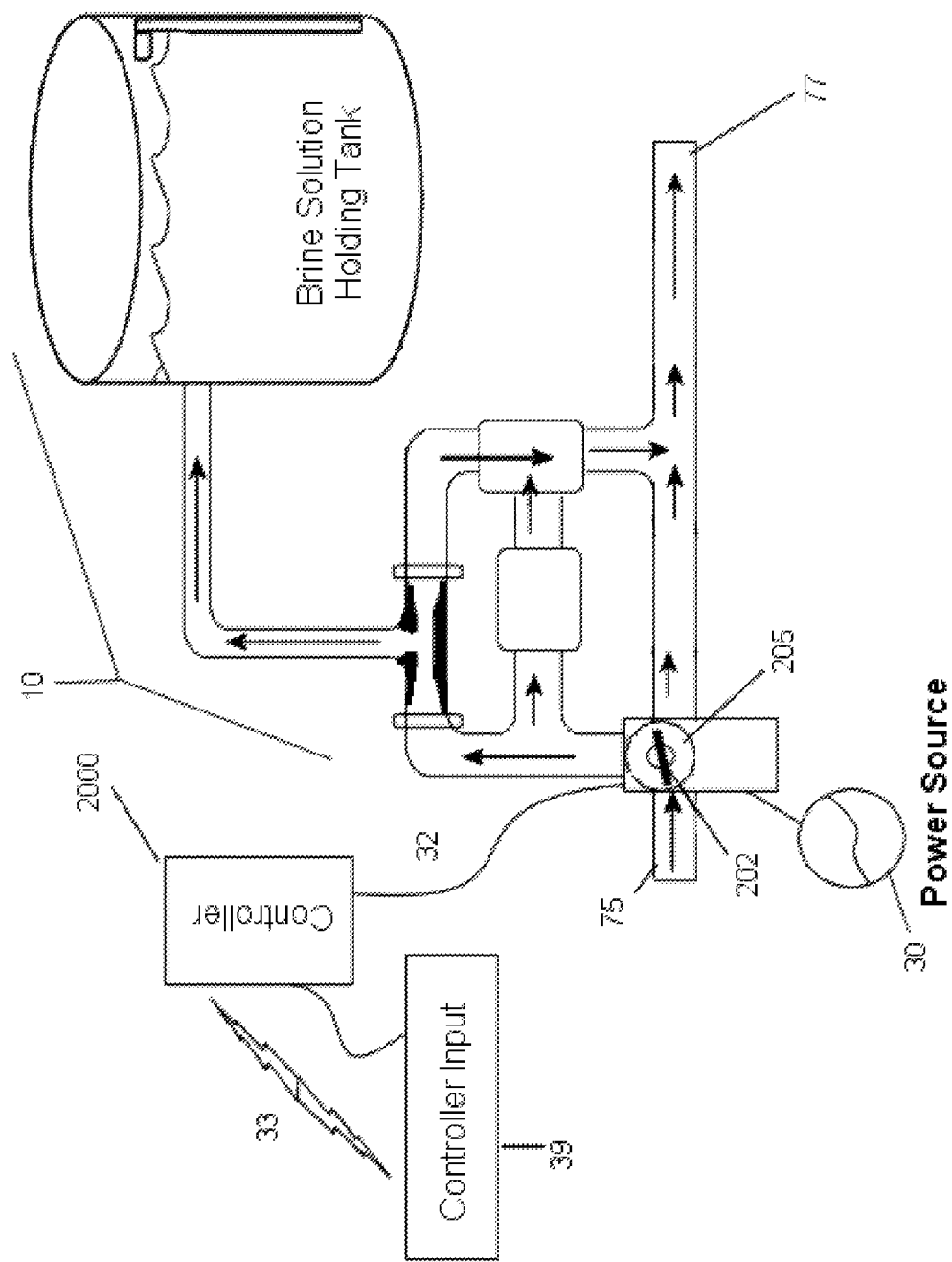

FIGS. 1A and 1B show an exploded view and an overview respectively of an exemplary embodiment of the instant invention. The exemplary embodiment can be utilized in any application for which it might be suited. One non-limiting example of an application is the use of the electronically controlled valve actuator in a water condition management, conditioning or treatment system, specifically in a chlorination system like that shown in applicant's co-pending application 60/778,392, filed Mar. 3, 2006 and incorporated herein by reference.

In such an installation, the system would be installed in the plumbed line at the point of, for instance, a two or three way valve 205 for redirecting water flow to a brine distribution system. The exemplary embodiment is mounted by removing any existing hardware on the stem of the existing valve. The shaft 150 has a hollow end 151 with splines (not shown) that match the existing splines on the valve shaft 202. Once seated on the valve shaft, the electronically controlled valve actuator is provided a power source 30, for instance through a typical plug or batteries. In the exemplary embodiment, a 120V AC power supply line is provided. In addition to the power supply, the actuator can provide for a communications input/output line 32 for relaying information to a master controller or a wireless communication device or wireless link 33 may be provided to similarly communicate data from the instant invention wirelessly. In an exemplary embodiment, this communication with outside controllers can be for instance provided via an RS 485 communication standard. Similarly, external devices can be coupled through the communications input/output line 32, for instance, a user input device, or an alternative port may be provided. Additionally, if the controller is located on the actuator, the communication output line 32 can also act as an input line for data from sensors.

The instant invention, as shown in the exemplary embodiment, includes an electronic motor 100 that drives a transmission device 175 that drives shaft 150 that is coupled to the valve as described above. The shaft 150 is turned by motor 100 and an at least one shaft encoder device 210, as part of the actuator controller 200, reads the motion and position of the shaft 150 feeding output to the actuator controller 200. The exemplary embodiment seals the motor 100 and electronics, including the actuator controller 200, in a housing 1. The housing 1, in the exemplary embodiment shown, includes an upper housing section 10, a lower housing section 5, and a chassis section 7. The housing 1, with its component parts, seals the electronics and motors in a watertight compartment, preventing intrusion of water.

The actuator controller 200 can include, for example, an at least one printed circuit board 220 and a controller IC 230, coupled to the at least one shaft encoder device 210 and controlling the position of the shaft, turning the shaft, and reporting this position via a graphical user interface 300. The actuator controller 200 has direct control over the position and operation of the electronic motor 100 and thereby the valve. Alternatively, the controller 200 can be slaved to an external or master controller 2000, which may be integral or external to the actuator, to control the function of the actuator in conjunction with a larger system controlling the water treatment, management, or conditioning system 10 as shown. In the exemplary embodiment, the on-board controller 200 can be programmed to provide a wide array of controllable positions based on either input from a master controller 2000 or manual input. In further exemplary embodiments, the actuator controller 200 can be the master controller and control the actuator based on data inputs from outside the actuator like controller input 39 shown in FIG. 1B in relation to master controller 2000.

In the exemplary embodiment shown, multiple programmable set points can be pre-programmed into the actuator controller 200. The controller 200 can be retrofit to replace existing manual and analog controlled valves having a splined valve stem or to integrate with an existing controller through the data communications provided. The motor 150 can be driven to turn the valve in either the clockwise or counterclockwise direction. Set points are pre-programmed on the actuator controller 200. Additionally, the set points can be changed through manual operation and programming of the actuator and actuator controller 200 as further explained below.

The actuator controller 200 of the exemplary embodiment shown responds to an outside master controller 2000 external to the housing coupled through the communications input/output line 32 or a wireless link 33. The master controller 2000 in this embodiment processes data inputs from sensors or controller inputs 39 and the controller actuator 200 is moved based on these inputs. In a further embodiment, sensors and sensor inputs transmit data directly to the actuator controller 200 as master controller and the actuator controller 200 changes position and control the water condition management system 10. The sensors and the data inputs from the sensors 39 can be for example, but are not limited to, pressure switches, flow switches or similar condition indicators and the data outputs can include, but are not limited to, temperature, ph, salinity, pressure, overall chemical makeup, flow speed, rates of change in these conditions, and similar data regarding the water or components of or within the water condition management system. Thus the actuator of the instant invention can automatically respond to changes in and/or control fluid flow, pressures, and other conditions within the water condition management system as a part of the system or as the master controller in the system.

The digital control capability allows the instant invention the ability to set the stop points or set points corresponding to specific operating positions of the actuator without removing any part of the housing 1, as required in the conventional analog controlled devices currently available. Thus, a greater number of operating points can be provided for and customized with minimal disruption to the water condition management system 10.

Thus, the actuator controller 200 can be adjusted in the field to respond to specific sensor input criteria, thresholds, or outputs 39 in conjunction with a master controller 2000 or acting as the master controller and, thereby, respond automatically to change the condition of the valve by programming through its communications input/output line 32, a 5 pin programming port, or through instructions from the master controller controlling the entire Water Condition Management System 10 that can be programmed to respond to specific sensor input criteria, thresholds, or outputs 39 and operate the actuator. Thus, the actuator can be utilized in a wide variety of water management systems. The programming can be pushed onto the master or the actuator controller through a portable computing device, through a wired connection, through a network, wirelessly, or through a similar method through a wired or wireless connection.

Figure 2:
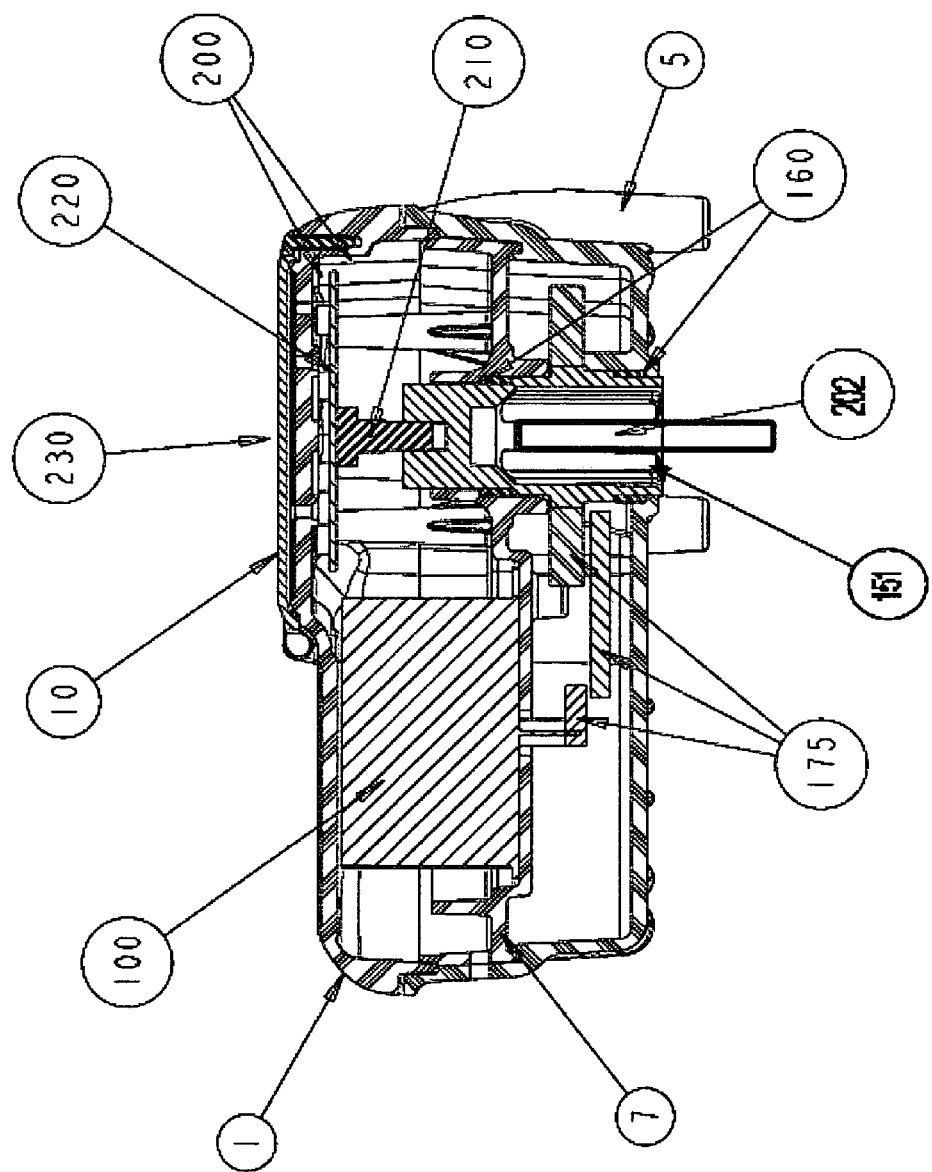
FIG. 2 shows a cross-section of an exemplary embodiment of the instant invention.

FIG. 2 shows a cross-section of an exemplary embodiment of the instant invention. The shaft 150 is clearly shown with the hollow, splined end 151 that fits over the valve stem (not shown). The motor 100 is sealed in the chassis 7 by the combination of the upper housing 5 and lower housing 10. Interspersed at critical points is an at least one sealing body member or device 160 to prevent intrusion of water into the housing 1. The shaft encoder 210 is provided on the shaft 150 and in communication with the controller 200. The controller 200 is in communication with an at least one indicator element 390 and user inputs 330, which comprise a graphical user interface 300.

Figure 3:
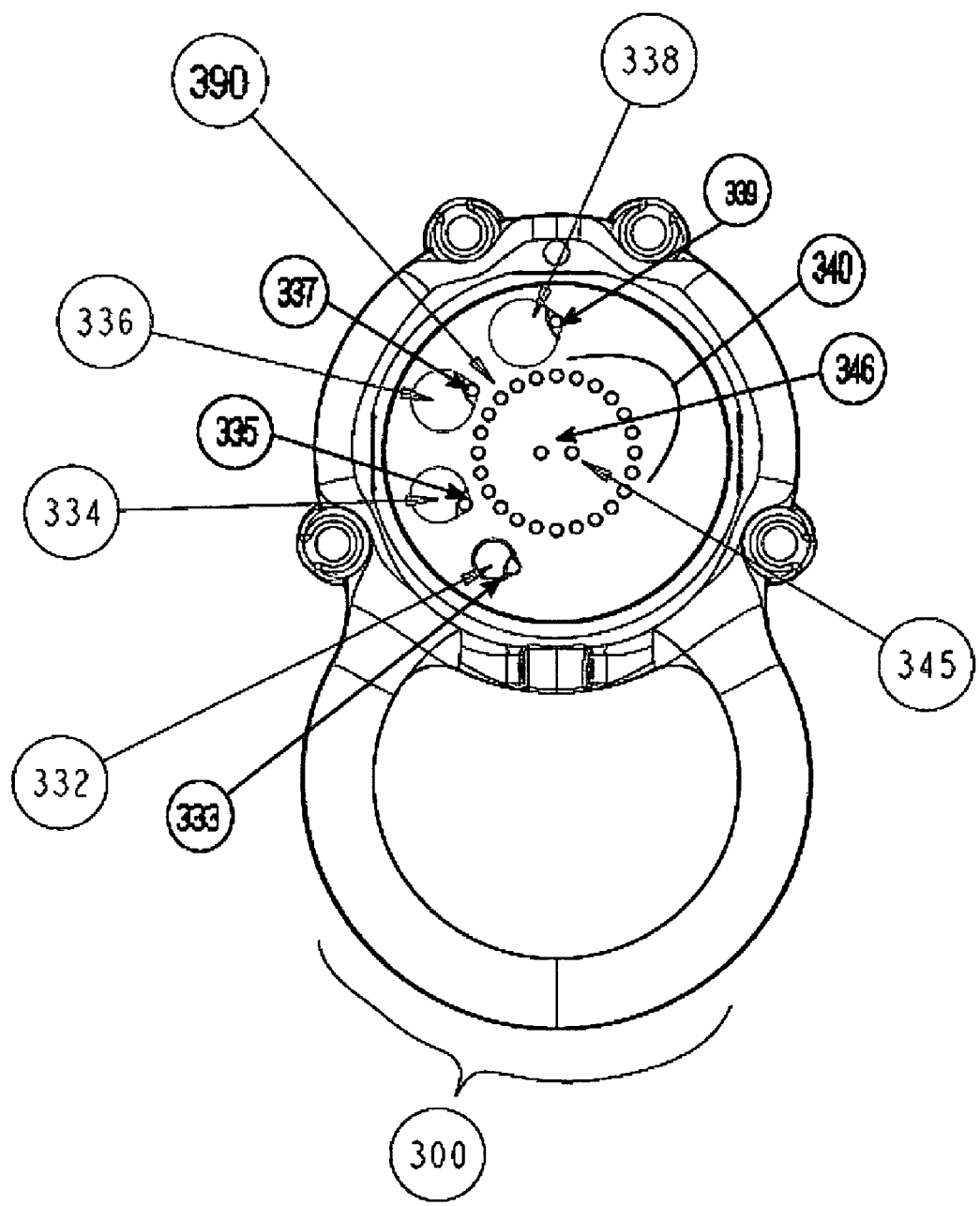
FIG. 3 shows top down view of an exemplary embodiment of a user interface of the instant invention.

FIG. 3 shows top down view of an exemplary embodiment of a user interface of the instant invention. The user interface 300, in the exemplary embodiment shown, includes an at least one indicator element 390, in this case a series of Light Emitting Diodes (LEDs) 340 for graphically displaying to a user the state of the valve and its current position. The exemplary embodiment, marketed as the INTELLIVALVE, is a digital actuator and controller unit The position of the valve is indicated by the at least one graphical indicator 390, here 24 green LEDs 340 that circle the top of the actuator. Each LED indicates a 15-degree incremental movement of the valve. Although in the exemplary embodiment of the invention, the actuator turns in 15-degree movements, greater or lesser incremental movements can be provided for and are within the scope of the invention.

In the exemplary embodiment, if the actuator is between the 15-degree positions, the respective LEDs preceding and following the current position blink to indicate the position of the actuator. There are also at least two LED's in the middle of the display dial in the exemplary embodiment. In this case, two LEDs are provided, one of these being an Amber LED 346 and the other being a Red LED 345. In the exemplary embodiment, these indicate the set movement position of the actuator either in the Clockwise direction (amber) 346 or Counterclockwise (red) 345. The movement is controlled by either the controller 200 or the user, depending on whether the actuator is in automatic or manual mode. A further indicator element, again a set of inputs 332, 338 and LEDs 333,339 as described herein below, indicates whether the device is in the automatic or manual mode and sets the set points.

The automatic operation of the actuator utilizes set points for controlled operation in any number of operating positions based on sensed parameters or conditions. The customized set points are programmed in a set mode, operated between in a manual mode, or set to operate automatically in an auto mode. The exemplary embodiment of the instant invention, for instance, is pre-set for a 180 degree, two-way operation automatically. If after installing the actuator the 180-degree rotation is correct but is opposite of the plumbing setup, the direction can be reversed. Most installations will probably not require adjusting the valve actuator, however, if a change in the rotation of the valve is required a customized set point or set points can be established in the set mode.

In the automatic mode the movement of the actuator and thereby the rotation of the valve is controlled by the controller 200. The controller 200 can be integral with the actuator, as depicted, or external to the actuator, as mentioned previously. The controller 200 receives data inputs from an at least one sensor, as previously discussed. In the exemplary embodiment the actuator is used in the Salt Dispensing System (SDS), which is described in co-pending application 60/778, 392, filed Mar. 3, 2006 and incorporated herein by reference. Based on these inputs the programmed logic or software on the controller 200 decides the position of the actuator. The system automatically moves to the set point position as directed by the controller 200 based on the sensor input received and the software.

In the exemplary embodiment, in the GUI 300 the set points of the actuator will remain lit, but the actual arc the valve will turn in will only light the LEDs when actuator is activated and will remain lit approximately one minute after the actuator finishes turning. Additional indicator patterns can be included to indicate, for example, emergency valve shutoff or to warn if a set position is exceeded while being manually operated or to indicate other operational scenarios. Additional indicators can also be provided, for instance, to indicate when the controller is communicating with external controllers and/or sensors, the operating mode of the actuator (e.g. automatic, manual, setting, programming, etc.), or any additional conditions that would be practical.

In setting customized set points, the set mode is entered. This may be accomplished through a further user input device or through a combination of existing user input devices. In the exemplary embodiment, this is accomplished in the exemplary embodiment by pressing and holding the auto/manual mode button 338 for a period of time. In this instance, the Auto/Manual LED will turn red 339. The user then uses the appropriate clockwise or counterclockwise button 334, 336 until the valve actuator display shows the desired stop point. The user then inputs the direction the actuator is to turn. This may be accomplished by any combination of existing or additional user inputs. In the exemplary embodiment, if it is clockwise, the set mode button 332 is pressed and released until the amber LED 333 is lit. By pressing and holding the Set Mode button 332, with the amber LED 333 lit for approximately two seconds or until the amber lights 346, 335, 337 on both the display 346 and the respective clockwise/counterclockwise buttons 334, 336 illuminate, the custom set point is input. Next the actuator can be moved by pressing the appropriate directional buttons 334, 336 to establish a second customized stop or set point or the user can end input by depressing the necessary user inputs. In the exemplary embodiment this is accomplished by pressing and holding the Auto/Manual button 338 once again to go back to Auto mode indicated by LED 339 turning green and the system is set and ready for automated operation between the customized set of stop points.

If the custom set points or the default programmed set points are correct, but they are operating exactly opposite of what is desired, in the Set Mode of the exemplary embodiment the user holds the clockwise 334 and counterclockwise 336 buttons down simultaneously for two seconds. The LED's in the center 345, 346 will blink and the actuator will now operate in a reverse mode. Similarly, if a user desires to reset the default stop positions, the user input can be operated to do so.

The actuator can also be operated in a manual mode. By depressing the Auto/Manual mode button 338 manual mode can be entered. The actuator is operated manually through an at least one user interface 330, in the exemplary embodiment it is shown as a set of buttons for clockwise movement 334 or counterclockwise movement 336. In this mode, the operator selects the open setting of the valve and receives output through the graphical interface. When the user pushes this button the first time, the LED turns from green to yellow and indicates the device is in manual mode by changing LED 339 next to the auto/manual mode button 338. In manual mode, the user can manually switch the valve from one position to another. The valve only manually operates the actuator from one position to the other, the controller is taken offline.

In this mode, in the exemplary embodiment the indictor LEDs light from Amber to Red in an arc as the system is moved. Additional or fewer indicator elements may be included and the pattern changed to show the turning of the instant invention without departing from the spirit of the invention. The current position of the valve is indicated by a blinking LED light. In the exemplary embodiment shown, the center position LED, indicating direction of traverse, is Amber or Red when current position is on Amber (clockwise) or Red (counterclockwise). The two buttons, clockwise and counter clockwise will operate in manual mode. Selecting the clockwise button (Amber) the actuator will move the Amber or counterclockwise position. Selecting the counterclockwise button, the actuator will move to the Red or clockwise set point.

A "safe area" is programmed into the arc of the controller based on the position of the valve relative to the input line. This feature would help prevent accidental overpressure situations. In the exemplary embodiment, for instance, if the position of the actuator is moved more than 12 positions, (⅛ of the led indicator dial) outside of the Amber or Red stop points, the non-arc side of the circle of LEDs 340 will start to flash and the SET button will flash red. The user will have to press the Clockwise or Counterclockwise button 334, 336 for two seconds to override the safety feature and continue moving outside the safe area or, in the case of the circular display, arc. If the Clockwise and Counterclockwise button is not pressed, the LEDs will return to normal in approximately 3 seconds and the Clockwise and Counterclockwise buttons will be ignored. In general, a valve, especially a two or three way valve, it is undesirable to completely shut the input line. Once the user has moved outside the safe area the unit will not warn the user again until the user enters and leaves the safe zone again. The degree and portion of the arc can be varied to suit the conditions of the water condition management system.

In the exemplary embodiment, to return to Auto mode, the user simply utilizes one of the user inputs. In the exemplary embodiment, the user simply press and holds the user input that changes the auto/manual mode 338 until the LED indicator element 339 turns green again. The Man/Auto button LED indicator element 339 is green for Auto mode. In this mode, the actuator will operate based on a signal from the controller, as outlined above. All other buttons will not respond while in this mode and the actuator will be moved between the set points.

The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

The invention claimed is:

1. An electronically controlled actuator and at least one valve in a plumbed water line within a water conditioning management system, comprising:
   an at least one valve having at least two operating positions besides closed or off with a valve stem in a plumbed water line within the water conditioning management system wherein the valve has an at least one water input and at least two water outputs;
   an at least one actuator;
   an at least one actuator housing;
   an at least one electronic controller in communication with the actuator wherein said controller activates the actuator to turn the electronically controlled actuator within the plumbed water line within the water conditioning management system, and thereby the valve, based on an input from an at least one control input from the water conditioning management system to one of the at least two operating positions to incrementally redirect water in the water conditioning management system between at least a first of the at least two water outputs and a second of the at least two water outputs, where the redirected water is conditioned by the water conditioning management system;
   an at least one shaft coupled to the actuator and said valve;
   an at least one shaft encoding device; and
   an at least one user interface with multiple indicator elements indicating the position of the valve and any incremental changes of this position, there being programmed at least two set points defining a safe area for operation of the valve and an opposite restricted zone as indicated by the indicator elements and including a warning indicator as part of the at least one user interface, the warning indicator indicating the attempt at passage of the valve during operation of the actuator to move through one of the at least two set points defining the safe area and into the restricted zone, the further passage outside the safe area through either of the at least two set points and into the restricted zone requiring activation of an override input which must be pressed to move the actuator and thereby the valve.

2. The electronically controlled actuator in a plumbed water line of claim 1, wherein the multiple indicator elements indicating the position of the valve are LEDs.

3. The electronically controlled actuator in a plumbed water line of claim 2, wherein the LEDs are arranged in a circle and triggered to light upon the passing of the valve through a designated position.

4. The electronically controlled actuator in a plumbed water line of claim 1, wherein the at least one user interface further comprises an at least one manual input for adjusting the at least one valve.

5. The electronically controlled actuator in a plumbed water line of claim 4, wherein the at least one manual input further comprises two manual inputs one associated with manual clockwise and the other associated with manual counterclockwise operation of the valve.

6. The electronically controlled actuator in a plumbed water line of claim 1, wherein the at least one user interface further comprises an at least one set point indicator.

7. The electronically controlled actuator in a plumbed water line of claim 1, wherein the housing further comprises a first housing component, a second housing component and a chassis, the first housing component being coupled to the second housing component and the chassis being held therebetween, the housing further containing the controller and the actuator and being releasably sealed and watertight.

* * * * *